United States Patent [19]

Pennatto

[11] Patent Number: 5,002,518
[45] Date of Patent: Mar. 26, 1991

[54] BELT TENSIONING APPARATUS

[76] Inventor: Samson L. Pennatto, 7 Peace St., Danbury, Conn. 06810

[21] Appl. No.: 506,723

[22] Filed: Apr. 9, 1990

[51] Int. Cl.⁵ ............................................. F16H 7/08
[52] U.S. Cl. .................................... 474/113; 474/138
[58] Field of Search ........ 474/101, 109, 111, 113–117, 474/136, 138, 137

[56] References Cited

U.S. PATENT DOCUMENTS

| | | | |
|---|---|---|---|
| 382,587 | 5/1888 | Bringold | 474/137 |
| 3,436,979 | 4/1969 | Molitor | 474/138 |
| 4,240,368 | 12/1980 | Adams | 112/220 |
| 4,571,221 | 2/1986 | Isobe et al. | 474/101 |
| 4,583,961 | 4/1986 | Kawasawa et al. | 474/113 |
| 4,838,101 | 6/1989 | Dobberpuhl et al. | 74/15.63 |

*Primary Examiner*—Thuy M. Bui
*Attorney, Agent, or Firm*—Thomas P. Murphy; Edwin T. Grimes

[57] ABSTRACT

A belt tensioning apparatus using a spring to provide the proper tension in a belt. A belt/pulley assembly is disclosed with one pulley slidably mounted on a bracket. A spring compressed to a fixed distance to provide a known force is attached to the bracket by a screw. The bracket, being initially free to move, transfers the force to the belt/pulley assembly for providing the optimum tension in the belt/pulley assembly. Once the proper tension in the belt is obtained, the bracket can be securely fixed, preventing movement between the pulleys in the assembly. Re-tensioning, when necessary, is accomplished easily by simply loosening and resecuring the bracket.

3 Claims, 1 Drawing Sheet

BELT TENSIONING APPARATUS

FIELD OF THE INVENTION

This invention relates generally to the tensioning of belts in belt/pulley assemblies, and more particularly, to a failsafe apparatus that accurately and easily applies the correct tension to a belt.

BACKGROUND OF THE INVENTION

In belt/pulley assemblies, it is important to obtain the proper tension for the system to function properly. The proper tension is necessary to avoid slipping and to prevent undue friction on the bearings or shafts holding the pulleys. If there is too little tension, the belts can slip, providing an inefficient and inaccurate drive train. If the tension is too great, excess friction and heat can develop, resulting in a shorter life for the belt, pulley bearings, and other parts associated with the belt/pulley assembly.

Typically, in adjusting the tension in a belt pulley system, the belt would be tightened until it felt right. This required a degree of guesswork, in combination with experience, to obtain an approximation of the proper tension. The deflection, with a known force, of the belt at the center of the belt span between the pulleys is also often used to approximate the proper tension. These adjustment techniques are inaccurate and difficult to accomplish. Additionally, a working but less than optimal tension is often obtained in a belt/pulley assembly using these techniques. This resulted in inefficiencies which cause subsequent problems, such as slipping, wear, or worn bearings. Also, in order to adjust the tension in a belt, it is often necessary to use two hands, or even the assistance of another individual. One of the pulleys in the belt/pulley assembly has to be loosened, moved, and held in position and resecured at the same time while maintaining the desired tension on the belt. This is often difficult to accomplish and usually after resecuring the pulley the tension in the belt is not correct.

While these techniques of tensioning a belt/pulley assembly have proven to be adequate for some applications, they are unacceptable for others, especially precision mechanisms.

Therefore, there is a need for a device that accurately and easily applies the proper tension to a belt/pulley assembly. Therefore, resulting in increased efficiency and life of the belt/pulley assembly.

SUMMARY OF THE INVENTION

The present invention is directed to an apparatus for tensioning a belt in a belt/pulley assembly. A spring compressed by a known distance provides a force which is used to tension the belt. A screw passes through the spring and a fixed stop compressing the spring between the screw head and fixed stop. The screw is threaded to a slidable bracket attached to a pulley. The force that provides tension in the belt that is equal to the optimum working tension specified for the belt/pulley assembly is calculated. A spring provides the required force by compressing it a known distance determined by the spring constant. The screw pulls on the bracket pulley assembly transmitting the proper tension to the belt. The bracket is subsequently secured to prevent relative movement between the pulleys. This maintains the proper tension in the belt during use. Additionally, once the spring is compressed to provide the desired tension in the belt, all that is necessary to re-tension the belt is simply to release the bracket and then resecure it.

Accordingly, it is an object of the present invention to provide a failsafe belt tensioning apparatus.

It is another object of the present invention to optimally tension the belt without guesswork.

It is an advantage of the present invention that the life of a belt, pulley bearings, and other parts associated with the belt/pulley assembly are extended.

It is another advantage of the present invention that the tensioning of the belt can be done easily.

It is a feature of the present invention that a spring is compressed by a calculated distance to provide a desired force.

It is another feature of the present invention that the belt can be tensioned easily and with one hand.

These and other objects, advantages, and features will become more readily apparent in view of the following more detailed description.

DETAILED DESCRIPTION OF THE PREFERRED EMBODIMENT

Figure 1:
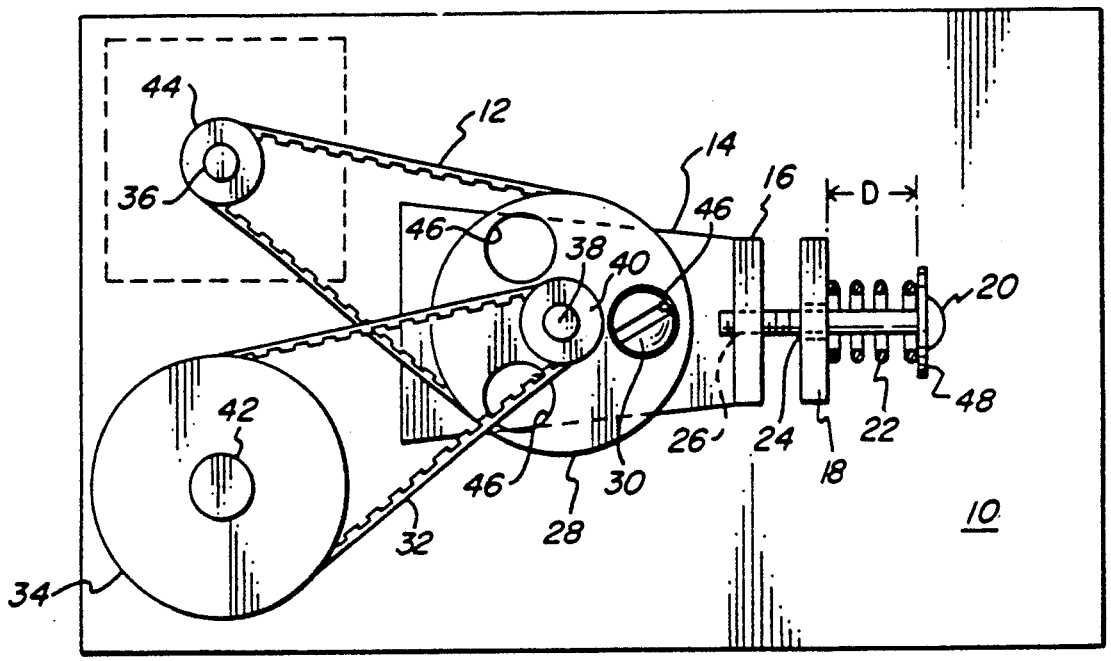
FIG. 1 is a top view of the present invention.

FIG. 1 illustrates the present invention. Extending through base 10 is a drive shaft 36 having a drive pulley 44 thereon. Also, extending through base 10 is an output shaft 42 with an output pulley 34 thereon. A first belt 12 connects the drive pulley 44 to a large idler pulley 28. A second belt 32 connects the output pulley 34 to a small idler pulley 40, which is attached to large idler pulley 28. The large and small idler pulleys are attached to an idler bracket 14 by idler shaft 38. Idler bracket 14 is free to move on base 10. However, idler bracket 14 can be secured to the base 10 by screw 30. Holes 46 can be placed in large idler pulley 28 to provide access to screw 30. Bracket 14 has a leg 16 extending perpendicular therefrom. Leg 16 has a tapped hole therein. Also mounted on base 10 is a spring stop 18. The spring stop 18 has a hole 24 therein. A screw 20 having a washer 48 extends through the center of a helical spring 22. The screw 20 extends freely through hole 24 and is threaded into tapped hole 26. Therefore, the spring is retained by washer 48 and spring stop 18. The distance between washer 48 and spring stop 18 forms a distance D.

Figure 2:
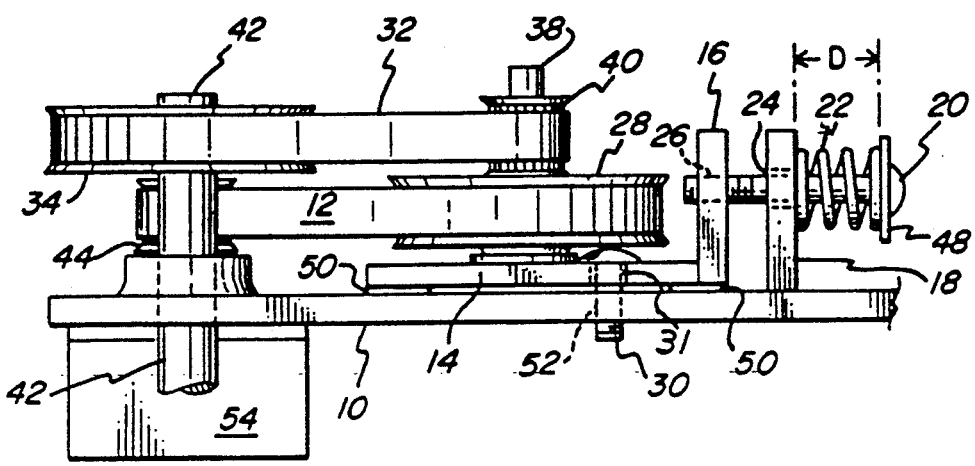
FIG. 2 is a front view of the present invention.

FIG. 2 illustrates more clearly the adjustable nature of idler bracket 14. Idler bracket 14 slides on surfaces 50 on base 10. Screw 30 extends through a hole 31 and a tapped screw hole 52. Hole 31 has a diameter greater than the diameter of the threaded portion of screw 30. Therefore, when screw 30 is loosened, bracket 14 is free to slide on base 10 and when screw 30 is tightened, the bracket 14 is securely fixed to base 10.

The operation of the device can now be readily appreciated with reference to FIGS. 1 and 2. Before tension can be applied to the belts 12 and 32, the spring 22 must be adjusted to provide the proper tension in belts 12 and 32. Once the tension required by the belt for optimum performance is determined based on the belt manufacturer's specification or other known methods, the force necessary to provide that tension is calculated. This force is then provided by the spring by compressing the spring by a known distance D to produce the desired tension. The distance D is determined by the force required and the properties of the spring. Therefore, a force is applied by spring 22 to idler bracket 14. When screw 30 is loosened, idler bracket 14 is free to move or slide. The spring 22 through screw 20 then provides the force necessary to optimally tension the belts 12 and 32. The screw 30 can then be tightened to securely attach bracket 14 to base 10. This prevents relative movement between the pulleys 28, 34, and 44. The tension in the belts 12 and 32 is therefore maintained.

Once the distance D is calculated to provide the required force to tension the belts 12 and 32, all that is necessary to re-tension the belts, should they loosen through wear or have to be removed and replaced, is to simply loosen screw 30 and then re-tighten screw 30. Therefore, adjusting the belt/pulley assembly to provide the optimum belt tension becomes a very simple operation. As long as the distance D is properly set, the tension in the belts can be adjusted to the optimum tension with virtually no likelihood of over-tensioning. Over-tensioning is a common cause of early bearing failure in belt/pulley assemblies. Additionally, the life of the belts 12 and 32 is extended.

The dual belt/pulley assembly illustrated is only an example of a belt/pulley assembly which can benefit from the present invention. It should be well understood that the present invention can be applied to any belt/pulley assembly.

Although the preferred embodiment has been described as illustrated, it will be apparent to those skilled in the art that various modifications may be made without departing from the spirit or scope of this invention.

What is claimed is:

1. A failsafe belt tensioning apparatus comprising:
   a base;
   a first pulley attached to said base;
   a bracket slidably mounted on said base;
   a leg having a tapped hole therein attached to said bracket and extending substantially perpendicular thereto;
   a second pulley attached to said bracket;
   a belt extending around and between said first and second pulleys;
   a stop having an untapped hole therein attached to said base;
   a screw having a single diameter threaded portion and a head extending through said hole in said stop and into said tapped hole in said leg;
   a spring placed around said screw between the head and said stop whereby a predetermined force can be applied to said belt; and
   set means, associated with said bracket and said base, for selectively preventing movement therebetween;
   whereby once said spring is adjusted to provide said predetermined force only said set means need be adjusted to retension said belt.

2. An apparatus as in claim 1, wherein said set means comprises:
   said bracket having a hole therein; and
   said base having a tapped hole therein; and
   a screw extending through said bracket and threaded into said base whereby said bracket can be securely attached to said base preventing relative movement therebetween.

3. An apparatus as in claim 1, wherein:
   the longitudinal axis of said screw intersects the axis of rotation of one of said first or second pulleys.

* * * * *